Patented Sept. 29, 1931

1,824,877

UNITED STATES PATENT OFFICE

CAMILLE DREYFUS, OF NEW YORK, N. Y., AND GEORGE SCHNEIDER, OF EAST ORANGE, NEW JERSEY, ASSIGNORS TO CELANESE CORPORATION OF AMERICA, A CORPORATION OF DELAWARE

CELLULOSE PROPIONATE AND PROCESS OF MAKING THE SAME

No Drawing. Application filed July 20, 1928. Serial No. 294,309.

This invention relates to the preparation of cellulose propionate, which cellulose propionate is soluble in a large variety of solvents, forms clear solutions and has other highly desirable properties, by a novel method.

An object of our invention is to provide a process for the making of cellulose propionate, whereby cellulose propionate of highly desirable properties may be produced. Other objects of our invention will appear from the following detailed description.

Cellulose acetate is used in large quantities in making artificial silk, celluloid like articles, coating compositions, etc. In making cellulose acetate, glacial acetic acid is used as a starting material, and since its melting point is below atmospheric temperatures in the colder seasons of the year, many difficulties are presented in the storage and handling of the same. Moreover, in the commercial method of making cellulose acetate, it is necessary to recover acetic acid from its aqueous solution, and this is complicated by the fact that since its boiling point is near that of water, acetic acid cannot be separated from aqueous solutions by ordinary fractional distillation. However, in making cellulose propionate these difficulties are avoided because of the fact that propionic acid has a very low melting point ($-20°$ C.) and a boiling point well above that of water ($140°$ C.). Moreover, cellulose propionate, when prepared in accordance with our invention, forms solutions in a very large variety of solvents as against comparatively few solvents for cellulose acetate and these solutions are of great brilliancy, thus producing yarns, films or plastic masses of high clarity.

In accordance with our invention, we prepare cellulose propionate by treating a suitable cellulosic material, either with or without a preliminary treatment which may be a "pretreatment" or a "prehydrolysis" or both, as explained below, with propionic anhydride in the presence of a suitable diluent and catalyst, under optimum conditions of time, temperature and proportions of reagents employed. The cellulose propionate thus formed is then subjected to after treatments, such as ripening to impart desirable solubility characteristics and other physical properties thereto, stabilization, washing, etc.

The cellulosic material employed is preferably any suitable material having cellulose in the undegraded form such as cotton, cotton linters, high grade wood pulp, etc. If desired, a more degraded form of cellulose such as reconstituted cellulose, obtained from viscose may be used, but vastly superior results are obtained by the use of undegraded cellulose.

For obtaining greater reactivity of the cellulosic material and thus increasing the rate of the propionylation process and also to obtain a cellulose propionate of higher clarity, we prefer first to subject the cellulose to a preliminary treatment which may include either a "pretreatment" process or a "prehydrolysis" process or both a pretreatment or a prehydrolysis process.

The "pretreatment" process comprises the treatment of the cellulosic material with a relatively small proportion of a lower fatty acid such as propionic acid, formic acid or acetic acid, and in the presence or in the absence of a small amount of a catalyst such as sulphuric acid. The propionic, formic or acetic acid may be applied to the cellulosic material in any suitable manner either in the form of a liquid, or in the form of a vapor.

One mode of pretreatment comprises the agitation of the cellulosic material with a relatively small amount of glacial acetic acid in a suitable apparatus, say a horizontal type of agitator. Instead of glacial acetic acid, weaker acetic acid of from 50% to 90% strength may be used. Instead of employing the organic acid in the liquid state, pretreatment may be affected by subjecting the cellulosic material to the vapors of the acid, such as acetic or formic acid, the vapors being employed either alone or in admixture with an inert gaseous carrier, such as air, nitrogen, carbon dioxide, etc., or the vapors may be generated by soaking the cellulosi materials in concentrated or dilute acids and subsequently passing air or other inert gas through the materials. Preferably after pretreatment, air or other inert gas is passed through the materials in order to remove the acid wholly or partially. The temperature of the pretreatment may be boiling temperatures of the organic acid used, or it may be below such temperature, and may be ordinary temperature or even below ordinary temperature. The time of treatment may be varied from one hour to five hours or more, depending on the concentration, amount and nature of the organic acid used, and the temperature employed. The amount of the lower fatty acid used may be varied within wide limitations, but we have found that if glacial acetic acid is used, excellent results are obtained by employing 10 to 30 parts of the glacial acetic acid to 100 parts of cellulose. From the technical point of view, the use of propionic acid as the pretreating agent is to be preferred, since if other acids are used, it is necessary to separate them from the propionic acid when they are recovered from the spent liquors formed in the process.

The "prehydrolysis" treatment comprises subjecting the cellulosic material to a bath containing the liquids to be used for propionylating cellulose, but which bath contains little or no catalysts for promoting the esterification, so that practically no esterification takes place. During this "prehydrolysis" treatment, any water that may be contained in the cellulosic material is destroyed, and probably the cellulose is hydrolized to some extent. The mixture of cellulosic material and prehydrolysis bath is stirred for a while and then a small amount of alkaline material or alkaline salts of weak acids, e. g. sodium propionate is added to neutralize the trace of acid catalyst that is present, and the mass is then further stirred. As stated, the prehydrolysis bath contains a mixture of liquids such as are used for esterifying cellulose minus the necessary catalysts. Thus if cellulose propionate is to be made, the prehydrolysis bath will contain propionic anhydride and a solvent or diluent, such as substantially anhydrous propionic acid or benzol.

The use of the term "prehydrolysis" in this connection is rather arbitrary, and it is to be understood that it does not necessarily infer that hydrolysis of the cellulose actually takes place in the process. As stated before, the cellulose prior to propionation may be subjected to either one of the processes of "pretreatment" or "prehydrolysis", or it may be first pretreated and then prehydrolized.

The cellulosic material, either without any of the preliminary treatments above described, or after having been subjected to either or both of the preliminary treatments, is subjected to a propionylating process by treatment with propionic anhydride, a diluent and a catalyst for promoting the propionylation.

The amount of propionic anhydride employed is preferably just in excess of that required to supply the amount of propionyl groups required to produce cellulose propionate of the desired propionyl value. In determining the amount of propionic anhydride required, due consideration should be given to the amount of water present in the cellulosic material and the reagents employed, since this water reacts with the propionic anhydride to form propionic acid.

The diluent employed in the propionylating mixture may be suitable solvents or diluents such as anhydrous propionic acid, glacial acetic acid, benzene or the like. However, in order to avoid complications in the recovery of the reagents from the spent liquors, we prefer to employ substantially anhydrous propionic acid as the diluent. The amount of diluent employed may be varied within comparatively wide limits depending on the requirements of the operator, but it should be used in sufficient amounts to produce reaction mixtures of the consistency required for controlling the cooling of such mixture. Generally it may be stated that the more diluent that is employed, the slower will be the reaction, and the higher the viscosity characteristics of the resulting cellulose propionate.

The catalyst that we prefer to employ is sulphuric acid, but other sulphuric forming catalysts such as the bisulphates of sodium or potassium, methyl sulphate, sulphonic acids or mixtures of these may be employed. If desired other catalysts such as zinc chloride or titanium chloride may be used. The amount of sulphuric acid employed may vary from 2 to 20% of the weight of cellulose depending on whether a preliminary treatment has or has not been employed. Generally if the cellulose has been subjected to a pretreatment process, 2 to 4% of sulphuric acid based on the weight of the cellulose may be used. If the cellulose has not been pretreated, 10 to 15% of sulphuric acid based on the weight of the cellulose may be generally employed. If a preliminary treatment of "prehydrolysis" has been employed, the propionylation process is instituted by the addition of the requisite amount of catalyst to the "prehydrolysis" bath.

The temperature of propionating is generally from 0° C. to 60° C. and is preferably below 50° C. At these temperatures, the time of propionylating is from 6 to 8 hours, depending on the temperature and the material and amount of preliminary treatment.

After the propionylation of the cellulose is completed, the cellulose propionate is soluble in chloroform and acetone but in order to impart softness to the fibres of the cellulose propionate, to facilitate precipitation of the same in fibrous form, and to render the same soluble in a large variety of solvent, the mass is subjected to an after treatment known as ripening or hydrolysis. This is done by the addition of water in amounts equal to 2 to 40% or more and preferably 25%, by weight of cellulose employed as the starting material, to the viscous solution produced by the propionylation. The mass is then kept at a temperature of 15° to 25° C. for 18 to 36 hours. The time and temperature employed are mutually dependent. The ripening is allowed to proceed to just before a point where the cellulose propionate begins to pass out of the soluble range of acetone.

After the mass has been ripened, the cellulose propionate is precipitated in a fibrous form by the addition of an excess quantity of water with vigorous agitation. The cellulose propionate is then washed substantially free of acid. The propionic acid may be recovered from the aqueous solution thus formed by direct fractional distillation, or by the formation of sodium propionate by the addition of alkali and the recovery thereof by evaporation of the water.

The precipitated cellulose propionate is then preferably stabilized by treatment of the fibres of cellulose propionate in a large volume of water containing a trace of sulphuric acid. This treatment causes the sulfo-propionate to split up and is continued for 3 to 4 hours or until the product is only just soluble in acetone and chloroform and also soluble in the solvents mentioned below.

The stabilized cellulose propionate is washed with water until it is neutral to sensitive litmus, and is then dried and may be ground to the fineness required for causing it readily to dissolve in solvents.

The cellulose propionate formed by our process has a solubility in a large range of solvents of varying boiling points from that of highly volatile solvents to the non-volatile solvents known as plastifiers. The cellulose propionate produced by our process is soluble among other solvents in acetone, methyl alcohol, methyl acetone, methyl acetate, methyl formate, ethyl acetate, ethyl lactate, diacetone alcohol, chloroform, tetrachlorethane, benzyl alcohol, benzyl acetate, benzyl benzoate, benzyl phthalate, benzene, toluene, diethyl phthalate, triacetin, triphenyl phosphate, tricresyl phosphate, cyclohexanone, butyl acetate and amyl acetate at all temperatures. It is also soluble in hot butyl alcohol and hot cyclohexanol. It is insoluble, in the cold, in butyl alcohol, ethyl alcohol or xylene, but it is partially soluble in these liquids when hot. This solubility in such a large variety or solvents distinguishes the cellulose propionate made by our process from other cellulose esters in a very important respect, since other cellulose esters, such as cellulose acetate, are soluble in but few solvents, which are often not suitable for certain specific purposes. On the other hand, because of the large variety of solvents available for our cellulose propionate, a suitable solvent may be found for any purpose.

The cellulose propionate formed by our process is eminently suitable for use in making artificial yarns or bristles by dissolving the same in any one of the volatile or other suitable solvents mentioned above, and extruding the solution thus formed through the orifices of a spinerette into a heated evaporative atmosphere, as in dry spinning, or into a precipitated bath as in wet spinning. Because of its high clarity it is very useful as an ingredient for making films and in plastic or coating compositions, which may contain besides a volatile solvent, medium and/or high boiling solvents, plastifiers, pigments or dyes. Besides films and yarns, lacquers, varnishes, celluloid articles, bristles, etc. may be made that contain our cellulose propionate.

In order further to illustrate our invention the following specific examples are given.

*Example I*

100 parts of cellulose (cotton linters) are mixed with a reagent consisting of 300 parts of propionic anhydride, 475 parts of propionic acid and 15 parts of sulphuric acid previously cooled to 10° C. In approximately two hours the temperature reaches about 35° C., at which temperature it is kept for about three hours. The cellulose during this period gradually assumes a pasty condition, and the temperature then drops over a period of about two hours to room temperature or about 25° C. At this point, the mass appears as a translucent, heavy, syrupy mixture substantially free of unattacked cotton fibres, and the reaction is considered complete. It is then subjected to an after treatment as described below.

*Example II*

100 parts of cotton linters are given a preliminary treatment of "pretreatment" by mixing in a closed vessel with 75 parts of propionic acid containing 3 parts of concentrated sulphuric acid for 3 hours at 25° C. This mixture of cotton and acid is then added to a mixture of 325 parts of propionic acid and 300 parts of propionic anhydride previously cooled to 10° C. After about one and one-half hours, the cellulose assumes a pasty form and the temperature of the mass is at about 32° C. The mass is cooled slightly at this point and after a further five hours, the mass is entirely free of undissolved fibres and has a temperature of above 21° C. The reaction is considered complete at this point, and the mass is ready for the after treatment described below.

*Example III*

100 parts of cellulose in the form of cotton linters are given a preliminary treatment by mixing with 100 parts of glacial acetic acid containing 2.5 parts of concentrated sulphuric acid for twenty-four hours at 25° C. in a closed vessel without stirring. A mixture of 300 parts of propionic acid and 500 parts of propionic anhydride is made, and to this mixture, which has a temperature of about 22° C., the pretreated cotton is added.

In approximately three-quarters of an hour the temperature rises to 37° C. and without further cooling gradually recedes to 24° C. during a further period of five hours. At this point, the reaction mass is a very heavy syrup that is substantially free (microscopically) of undissolved fibres. The reaction is now considered complete.

The reaction mass resulting from any of the processes described in Examples I, II, and III is then subjected to an after treatment. The reaction mass is tested for the quantity of free propionic anhydride present, and this anhydride is forthwith hydrolized to propionic acid by the addition of the requisite amount of water. 20 to 30 parts of water in addition to that required for hydrolizing the propionic anhydride are then mixed in thoroughly and the mass is permitted to stand (ripen) for a period of twenty-four hours at 25° C. A sample taken from the mass at this point, when precipitated by water, washed free of acids and dried, shows that the solubility of the cellulose propionate in benzol and butyl acetate is approaching that which is desired. The mass proper is then, therefore, precipitated in a similar manner by the addition of water and is then washed practically free of acid.

The precipitated product is then placed in about twenty times its weight of water containing less than .05% of sulphuric acid and boiled for a period of four hours or until a sample of the above material, when dried, shows the desired solubility in acetone, butyl acetate, etc. This treatment with boiling water containing a trace of mineral acid serves the double purpose of splitting up the sulfoesters of cellulose formed during the reaction when sulfuric acid is used as catalyst thus increasing the thermo stability of the product and, at the same time, completing the hydrolysis of the product, the main portion of which is accomplished during the "ripening" process, so that the product is soluble in the solvents desired, which comprises those enumerated above.

It is to be understood that the foregoing is given merely by way of illustration and that many variations may be made therein without departing from the spirit of the invention.

Having described our invention, what we claim and desire to secure by Letters Patent is:

1. Method of preparing cellulose propionate comprising treating the cellulosic material with a reagent comprising propionic anhydride and a sulphuric forming catalyst and then partially hydrolizing the cellulose propionate thus formed.

2. Method of preparing cellulose propionate comprising treating a material containing substantially undegraded cellulose with a reagent comprising propionic anhydride and a sulphuric forming catalyst and then partially hydrolizing the cellulose propionate thus formed.

3. Method of preparing cellulose propionate comprising treating cellulosic material with a reagent comprising propionic anhydride and sulphuric acid and then partially hydrolizing the cellulose propionate thus formed until it is soluble in benzol and butyl acetate.

4. Method of preparing cellulose propionate comprising treating a material containing substantially undegraded cellulose with a reagent comprising propionic anhydride and sulphuric acid and then partially hydrolizing the cellulose propionate thus formed until it is soluble in benzol and butyl acetate.

5. Method of preparing cellulose propionate comprising pretreating cellulosic material with a lower fatty acid for a period of time, subjecting the pretreated cellulosic material to the action of a reagent comprising propionic anhydride and a catalyst and then partially hydrolizing the cellulose propionate thus formed.

6. Method of preparing cellulose propionate comprising pretreating cellulosic material with a lower fatty acid for a period of time, subjecting the pretreated cellulosic material to the action of a reagent comprising propionic anhydride and sulphuric acid and then partially hydrolizing the cellulose propionate thus formed.

7. Method of preparing cellulose propionate comprising pretreating a cellulose material with a quantity of lower fatty acid, then treating the cellulosic material in a bath containing propionic anhydride, which bath contains no catalyst, and then causing propionylation of the cellulose to proceed by the addition of a catalyst.

8. Method of preparing cellulose propionate comprising pretreating a cellulosic material with a quantity of lower fatty acid, then treating the cellulosic material in a bath containing propionic anhydride, which bath contains no catalyst, and then causing propionylation of the cellulose to proceed by the addition of sulphuric acid.

9. Method of preparing cellulose propionate comprising pretreating a cellulosic material with a quantity of lower fatty acid, then treating the cellulosic material in a bath containing propionic anhydride, which bath contains no catalyst, then causing the propionylation of the cellulose to proceed by the addition of a catalyst, and then partially hydrolizing the cellulose propionate thus formed.

10. Method of preparing cellulose propionate comprising pretreating a cellulosic material with a quantity of lower fatty acid, then treating the cellulosic material in a bath containing propionic anhydride, which bath contains no catalyst, then causing propionylation of the cellulose to proceed by the addition of sulphuric acid, and then partially hydrolizing the cellulose propionate thus formed.

11. Method of preparing cellulose propionate comprising treating the cellulosic material in a bath containing propionic anhydride, which bath contains no catalyst, and then causing propionylation of the cellulose to proceed by the addition of a catalyst.

12. Method of preparing cellulose propionate comprising treating the cellulosic material in a bath containing propionic anhydride, which bath contains no catalyst, and then causing propionylation of the cellulose to proceed by the addition of sulphuric acid.

13. Method of preparing cellulose propionate comprising treating the cellulosic material in a bath containing propionic anhydride, which bath contains no catalyst, then causing propionylation of the cellulose to proceed by the addition of a catalyst, and then partially hydrolizing the cellulose propionate thus formed.

14. Method of preparing cellulose propionate, comprising treating the cellulosic material in a bath containing propinonic anhydride, which bath contains no catalyst, then causing propionylation of the cellulose to proceed by the addition of sulphuric acid, and then partially hydrolizing the cellulose propionate thus formed.

15. Cellulose propionate formed by treatment of cellulosic material with propionic anyhdride in the presence of sulphuric forming catalyst, said cellulose propionate being ripened to such a degree that it is soluble in benzol and butyl acetate.

16. Cellulose propionate of high clarity and being soluble in benzol and butyl acetate.

In testimony whereof, we have hereunto subscribed our names.

CAMILLE DREYFUS.
GEORGE SCHNEIDER.